United States Patent
Tiirola et al.

(10) Patent No.: US 10,182,420 B2
(45) Date of Patent: Jan. 15, 2019

(54) ENHANCED PHYSICAL UPLINK CONTROL CHANNEL FORMAT RESOURCE ALLOCATION FOR TIME DIVISION DUPLEX MODE

(75) Inventors: Esa Tapani Tiirola, Kempele (FI); Chun Yan Gao, Beijing (CN); Peng Chen, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 189 days.

(21) Appl. No.: 13/703,435

(22) PCT Filed: Jun. 18, 2010

(86) PCT No.: PCT/CN2010/074059
§ 371 (c)(1),
(2), (4) Date: Apr. 1, 2013

(87) PCT Pub. No.: WO2011/156967
PCT Pub. Date: Dec. 22, 2011

(65) Prior Publication Data
US 2013/0182619 A1    Jul. 18, 2013

(51) Int. Cl.
*H04L 1/16* (2006.01)
*H04W 72/04* (2009.01)
*H04L 1/18* (2006.01)
*H04L 5/00* (2006.01)

(52) U.S. Cl.
CPC ............ *H04W 72/04* (2013.01); *H04L 1/1621* (2013.01); *H04L 1/1861* (2013.01); *H04L 5/001* (2013.01); *H04L 5/0055* (2013.01)

(58) Field of Classification Search
CPC ........................... H04L 1/1621; H04L 1/1861
See application file for complete search history.

(56) References Cited

U.S. PATENT DOCUMENTS

| | | | |
|---|---|---|---|
| 2009/0175233 A1 | 7/2009 | Ojala et al. | |
| 2009/0241004 A1* | 9/2009 | Ahn et al. | 714/749 |
| 2009/0257408 A1 | 10/2009 | Zhang et al. | 370/336 |

(Continued)

FOREIGN PATENT DOCUMENTS

| | | |
|---|---|---|
| CN | 101351052 A | 1/2009 |
| CN | 101473583 A | 7/2009 |

(Continued)

OTHER PUBLICATIONS

R1-091526, 3GPP TSG RAN WG1 meeting #56bis, Seoul, Korea, Mar. 23-27, 2009, "UL ACK/NACK transmission in LTE-A", CATT, 4 pgs.

(Continued)

*Primary Examiner* — Jason E Mattis
*Assistant Examiner* — Kevin Cunningham
(74) *Attorney, Agent, or Firm* — Harrington & Smith

(57) ABSTRACT

In one aspect thereof the exemplary embodiments provide a method that includes, when in a time division duplex mode of operation with a user equipment, allocating physical uplink control channel resources by reserving physical uplink control channel resources with a granularity of one acknowledge/negative acknowledge (ACK/NACK) bundle; and sending an indication of the allocated physical uplink control channel resources from a network access node to the user equipment.

20 Claims, 13 Drawing Sheets

(56) References Cited

U.S. PATENT DOCUMENTS

| | | | |
|---|---|---|---|
| 2009/0323617 A1* | 12/2009 | Che | H04L 1/1635 370/329 |
| 2010/0150081 A1* | 6/2010 | Gao et al. | 370/329 |
| 2010/0272048 A1* | 10/2010 | Pan et al. | 370/329 |
| 2011/0002276 A1 | 1/2011 | Chen et al. | 370/329 |
| 2011/0141878 A1* | 6/2011 | Che et al. | 370/216 |
| 2011/0176443 A1* | 7/2011 | Astely | H04L 1/1607 370/252 |
| 2011/0310856 A1* | 12/2011 | Hariharan | H04L 1/1607 370/336 |

FOREIGN PATENT DOCUMENTS

| | | |
|---|---|---|
| CN | 101689984 A | 3/2010 |
| EP | 1205084 A1 | 5/2002 |
| RU | 2234193 C2 | 8/2004 |
| WO | WO 01/10159 A1 | 2/2001 |
| WO | WO 2005/020475 A1 | 3/2005 |
| WO | WO 2009/022749 A2 | 2/2009 |
| WO | WO 2009/045011 A1 | 4/2009 |
| WO | WO-2009/116760 A2 | 9/2009 |
| WO | WO 2009/120843 A2 | 10/2009 |
| WO | WO 2010/051695 A1 | 5/2010 |

OTHER PUBLICATIONS

R1-100363, 3GPP TSG RAN WG1 Meeting #59bis, Valencia, Spain, Jan. 18-22, 2010, "PUCCH resource allocation for carrier aggregation" Panasonic, 7 pgs.

R1-100243, 3GPP TSG RAN WG1 Meeting #59bis, Valencia, Spain, Jan. 18-22, 2010, "UL ACK/NACK resource allocation for carrier aggregation", Huawei, 6 pgs.

R1-101886, 3GPP TSG RAN WG1 Meeting #60bis, Beijing, China, Apr. 12-16, 2010, "UL ACK/NAK Feedback in LTE-A TDD" Nokia, Nokia Siemens Networks, 4 pgs.

3GPP TR 36.912 V9.3.0 (Jun. 2010), "$3^{rd}$ Generation Partnership Project; Technical Specification Group Radio Access Network; Feasibility study for Further Advancements for E-UTRA (LTE-Advanced) (Release 9)", 61 pgs.

3GPP TS 36.300 V9.3.0 (Mar. 2010) "$3^{rd}$ Generation Partnership Project; Technical Specification Group Radio Access Network; Evolved Universal Terrestrial Radio Access (E-UTRA) and Evolved Universal Terrestrial Radio Access network (E-UTRAN); Overall description; Stage 2 (Release 9)", 166 pgs.

3GPP TS 36.300 V8.11.0 (Dec. 2009), "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 148 pgs.

3GPP TR 36.913 V9.0.0 (Dec. 2009), "$3^{rd}$ Generation Partnership Project; Technical Specification Group Radio Access Network; Requirements for further advancements for Evolved Universal Terrestrial Radio Access (E-UTRA) (LTE Advanced) (Release 9)", 15 pgs.

3GPP TS 36.211 V9.1.0 (Mar. 2010), "$3^{rd}$ Generation Partnership Project; Technical Specification Group Radio Access Network; Evolved Universal Terrestrial Radio Access (E-UTRA); Physical Channels and Modulation (Release 9)", 85 pgs.

Ericsson, TSG-RAN WG1 #52bis, R1-081528, "Details of ACK/NAK bundling for TDD", Shenzhen, China, Mar. 31-Apr. 4, 2008, 4 pages.

ZTE, 3GPP TSG RAN WG1 Meeting #55bis, R1-090078, "Uplink Control Channel Design for LTE-Advanced", Ljubljana, Slovenia, Jan. 12-16, 2009, 4 pages.

Catt et al., 3GPP TSG RAN WG1 meeting #55bis, R1-090188, "UL Control Channel Scheme for LTE-A", Ljubljana, Slovenia, Jan. 12-16, 2009, 5 pages.

R1-083291; Texas Instruments, et al.; Way forward on TDD PUCCH multi-bit ACK/NAK transmission; 3GPP TSG RAN WG1 #54; Jeju, South Korea, Aug. 18-22, 2008.

R1-101023, 3GPP TSG-RAN 1 #60, "UL ACK/NACK feedback for LTE-A", Feb. 2010, 3 pgs.

Nokia, Nokia Siemens Networks, UL ACK/NAK Feedback for Power-Limited UE in LTE-A TDD[online], 3GPP TSG-RAN WG1#61 R1-102939, May 24, 2010, URL: http://www.3gpp.org/ftp/tsg_ran/WG1_RL1/TSGR1_61/Docs/R1-102939.zip.

* cited by examiner

5x20MHz COMPONENT CARRIERS

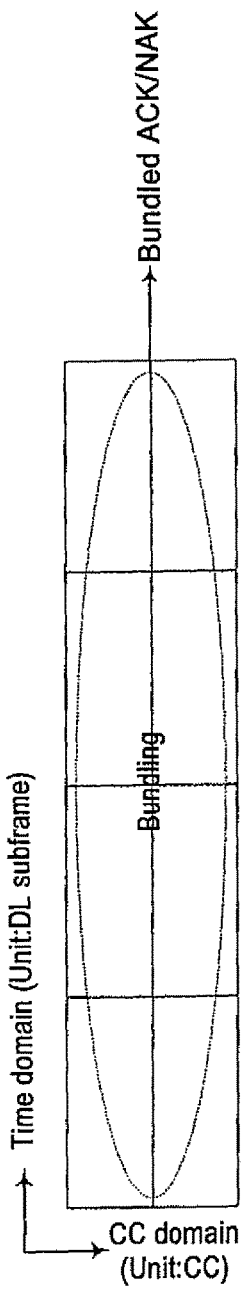
Figure 3. ACK/NAK full bundling
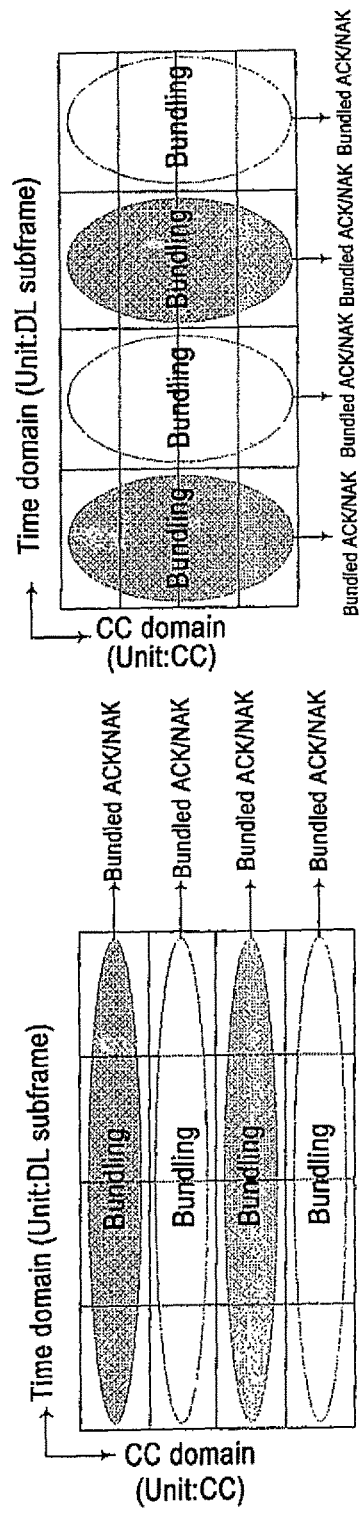
Figure 4. Time-domain and CC-domain bundling for ACK/NAK Constellation point selection for embodiment of Figure 5A

| Selected Constellation point (QPSK) | ACK/NAK value & DAI value of last received PDCCH |
|---|---|
| (0,0) | NAK, any DAI value |
| (0,1) | ACK, DAI=0 or 3 |
| (1,0) | ACK, DAI=1 |
| (1,1) | ACK, DAI=2 |

FIGURE 5B

ENHANCED PHYSICAL UPLINK CONTROL CHANNEL FORMAT RESOURCE ALLOCATION FOR TIME DIVISION DUPLEX MODE

TECHNICAL FIELD

The exemplary and non-limiting embodiments of this invention relate generally to wireless communication systems, methods, devices and computer programs and, more specifically, relate to resource allocation-related signaling between a network access node and a user equipment, as well as to uplink acknowledgement reporting techniques.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
ACK acknowledge
BS base station
BW bandwidth
CA carrier aggregation
CC component carrier
CCE control channel element
DAI downlink assignment index
DL downlink (eNB towards UE)
eNB E-UTRAN Node B (evolved Node B)
EPC evolved packet core
E-UTRAN evolved UTRAN (LTE)
FDMA frequency division multiple access
HSPA high speed packet access
IMTA international mobile telecommunications association
ITU-R international telecommunication union-radiocommunication sector
LTE long term evolution of UTRAN (E-UTRAN)
LTE-A LTE advanced
MAC medium access control (layer 2, L2)
MM/MME mobility management/mobility management entity
NACK not (negative) acknowledge
NodeB base station
OFDMA orthogonal frequency division multiple access
O&M operations and maintenance
PDCCH physical downlink control channel
PDCP packet data convergence protocol
PHY physical (layer 1, L1)
PUCCH physical uplink control channel
PUSCH physical uplink shared channel
QPSK quadrature phase shift keying
Rel release
RLC radio link control
RRC radio resource control
RRM radio resource management
SGW serving gateway
SC-FDMA single carrier, frequency division multiple access
TDD time division duplex
UE user equipment, such as a mobile station, mobile node or mobile terminal
UL uplink (UE towards eNB)
UPE user plane entity
UTRAN universal terrestrial radio access network One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009-12), "3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8)," incorporated by reference herein in its entirety. This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.3.0 (2010-03).

FIG. 1A reproduces FIG. 4.1 of 3GPP TS 36.300 V8.11.0, and shows the overall architecture of the EUTRAN system (Rel-8). Reference can also be made to FIG. 1B. The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMTA systems, referred to herein for convenience simply as LTE-Advanced (LTE-A). Reference in this regard may be made to 3GPP TR 36.913, V9.0.0 (2009-12), 3rd Generation Partnership Project; Technical Specification Group Radio Access Network; Requirements for Further Advancements for E-UTRA (LTE-Advanced) (Release 9). Reference can also be made to 3GPP TR 36.912 V9.3.0 (2010-06) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

As is specified in 3GPP TR 36.913, LTE-A should operate in spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities, A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 1C shows an example of the carrier aggregation, where M Rel-8 component carriers are combined together to form MHRel-8 BW (e.g. 5 H 20 MHz=100 MHz given M=5). Rel-8 terminals receive/transmit on one component carrier, whereas LTE-A terminals may receive/transmit on multiple component carriers simultaneously to achieve higher (wider) bandwidths. It has been agreed that up to five CCs can be aggregated in LTE-Advanced in both the FDD and TDD systems.

FIG. 1D depicts the use of aggregate component carriers in terms of the system bandwidth. In FIG. 1D, the total system bandwidth is shown as 100 MHz (frequency). In Case 1, a first case for LTE-A with aggregated component carriers, all of this bandwidth is aggregated and used by a single UE device. In case 2, the bandwidth is partially aggregated into two 40 MHz groups, leaving a 20 MHz grouping. This remaining bandwidth may be used, for example, by a Release 8 LTE UE, which only requires 20 MHz. It should be noted that the CA configuration is UE specific, which means that that Rel-8 UEs can operate in each of the five carriers shown. In Case 3 none of the CCs are aggregated and thus five 20 MHz components are available for use by five different UEs.

3GPP TS 36.211 V9.1.0 (2010-03) Technical Specification 3rd Generation Partnership Project; Technical Specification Group Radio Access Network; Evolved Universal Terrestrial Radio Access (E-UTRA); Physical Channels and Modulation (Release 9) describes in Section 5.4.1 the PUCCH formats 1, 1a and 1b.

In LTE Rel-8 TDD the UE has the possibility to report ACK/NACK feedback associated with multiple DL subframes during one UL subframe. Hence, the ACK/NACK resources corresponding to multiple DL subframes are reserved on the corresponding UL subframe in an implicit manner (i.e., based on the mapping between ACK/NACK resources and the first CCE of the corresponding PDCCH). Explicit PUCCH resource allocation is applied for a persistently scheduled PDSCH.

For the LTE-Advanced system it has been agreed in 3GPP RAN1#58bis to support the mapping of ACK/NACK resources on one UE-specific UL CC. For the LTE-Advanced TDD system this implies that multiple ACK/NACK resources (corresponding to multiple DL subframes in the time domain and multiple (DL) CCs in the frequency domain) need to be allocated on one UE-specific (UL) CC during a single UL subframe.

This approach can be expected to increase PUCCH resource allocation/consumption on the UE-specific UL CC. From a resource consumption point of view it would be desirable to provide an efficient PUCCH format 1a/1b resource allocation for LTE-Advanced TDD.

SUMMARY

The foregoing and other problems are overcome, and other advantages are realized, by the use of the exemplary embodiments of this invention.

In a first aspect thereof the exemplary embodiments of this invention provide a method that comprises, when in a time division duplex mode of operation with a user equipment, allocating physical uplink control channel resources by reserving physical uplink control channel resources with a granularity of one acknowledge/negative acknowledge (ACK/NACK) bundle; and sending an indication of the allocated physical uplink control channel resources from a network access node to the user equipment.

In a further aspect thereof the exemplary embodiments of this invention provide an apparatus that comprises a processor and a memory including computer program code, where the memory and computer program code are configured to, with the processor, cause the apparatus at least to, when in a time division duplex mode of operation with a user equipment, allocate physical uplink control channel resources by reserving physical uplink control channel resources with a granularity of one acknowledge/negative acknowledge (ACK/NACK) bundle; and send an indication of the allocated physical uplink control channel resources from a network access node to the user equipment.

In a further aspect thereof the exemplary embodiments of this invention provide a method that comprises obtaining at a user equipment an allocation of a single physical uplink control channel format 1a/1b resource, where physical uplink control channel resources are reserved with a granularity of one acknowledge/negative acknowledge (ACK/NACK) bundle; performing ACK/NACK bundling across spatial codewords, where one bundled ACK/NACK bit per received component carrier/subframe is generated); and selecting a constellation point for transmission on the uplink based on a value of a bundled ACK/NACK bit and a value of a downlink assignment index of a last received physical downlink control channel within an ACK/NACK bundle.

In a still further aspect thereof the exemplary embodiments of this invention provide a method that comprises obtaining at a user equipment an allocation of a plurality of physical uplink control channel format 1a/1b resources, where physical uplink control channel resources are reserved with a granularity of one acknowledge/negative acknowledge (ACK/NACK) bundle; and selecting one of the plurality of physical uplink control channel format 1a/1b resources to send a bundled ACK/NACK result based on a value of a downlink assignment index of a last received physical downlink control channel within an ACK/NACK bundle.

BRIEF DESCRIPTION OF THE DRAWINGS

In the attached Drawing Figures:

FIG. 3 illustrates ACK/NACK full bundling.

FIG. 4 illustrates time domain and CC domain bundling for ACK/NACK.

FIG. 5B is table that illustrates constellation point selection for the embodiment of FIG. 5A.

DETAILED DESCRIPTION

Figure 1A:
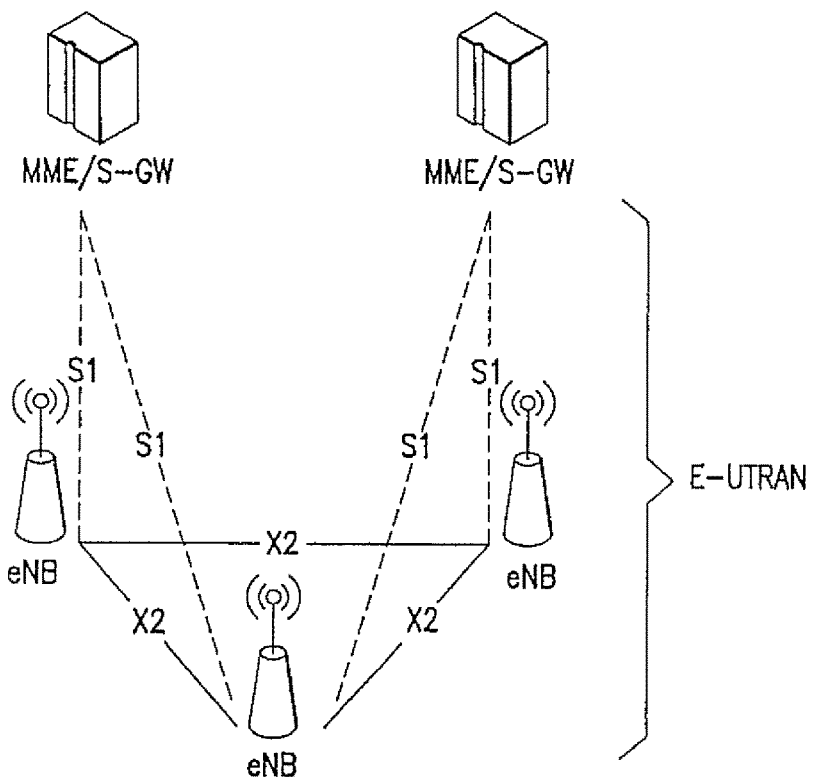
FIG. 1A reproduces FIG. 4.1 of 3GPP TS 36.300, and shows the overall architecture of the EUTRAN system.
Figure 1C:
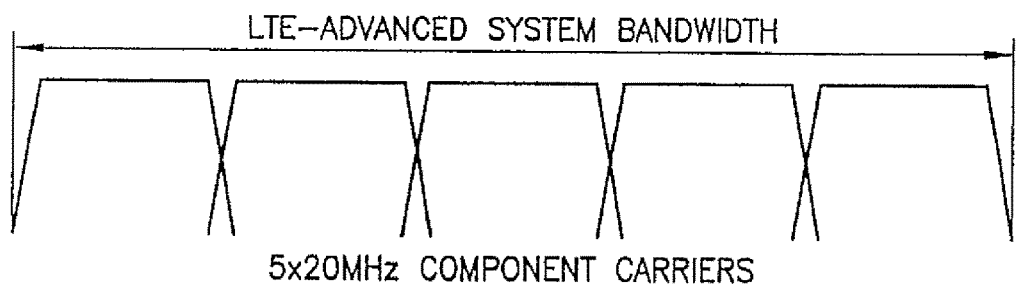
FIG. 1C shows an example of carrier aggregation as proposed for the LTE-A system.
Figure 1B:
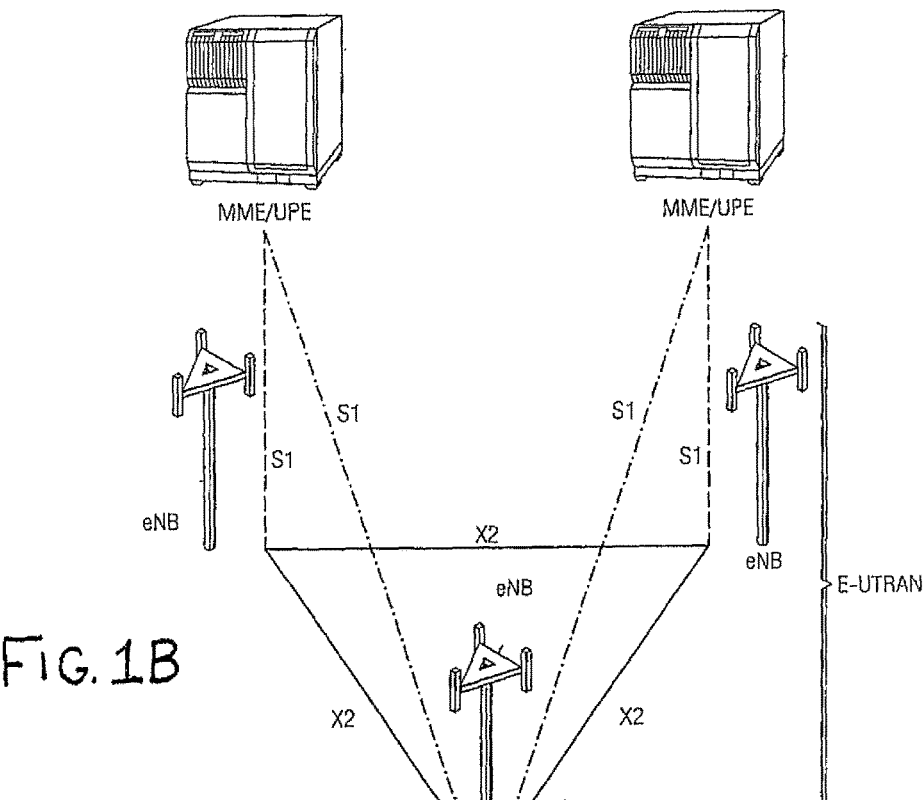
FIG. 1B presents another view of the EUTRAN system.
Figure 1D:
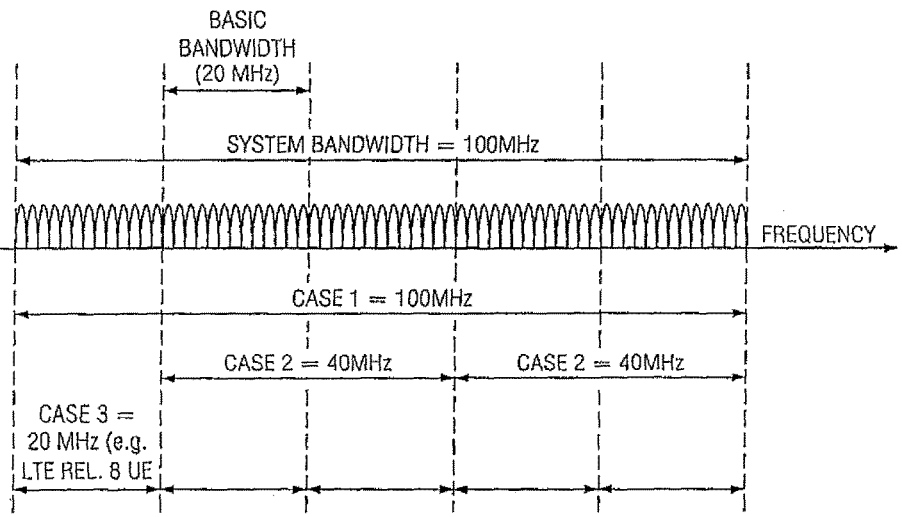
FIG. 1D depicts the use of aggregate component carriers in terms of system bandwidth.

The exemplary embodiments of this invention relate, at least in part, to an LTE-Advanced wireless communication system which is expected to be implemented in 3GPP LTE Rel-10 (although the exemplary embodiments are not limited to only LTE Rel-10). More specifically, the exemplary embodiments are directed to PUCCH format 1a/1b (i.e., ACK/NACK resource) allocation in the case of component carrier (CC) aggregation in the TDD mode.

Generally, TDD operation implies the use of single carrier that is time multiplexed between transmissions from the eNB to the UE and transmissions from the UE to the eNB.

The exemplary embodiments focus on PUCCH format 1a/1b resource allocation and provide an efficient allocation technique that is applicable to, but not limited to, the LTE-Advanced TDD system.

As was noted above, in LTE Rel-8 the PUCCH resource for ACK/NACK feedback corresponding to a dynamically scheduled PDSCH is implicitly determined by the first CCE of the corresponding PDCCH. In LTE-Advanced this type of implicit ACK/NACK resource reservation scheme should be preserved at least for the case of the backward compatible DL CC paired with an UL CC. However, reserving the dynamic ACK/NACK resource for all cross-CCs in the same way as done for the paired DL CC will result in an inefficient use of the PUCCH resource. This would basically require reserving dynamic ACK/NACK resources corresponding to all DL CCs in each of the UL CCs.

Furthermore, for the LTE-Advanced TDD system multiple ACK/NACK resources (corresponding to multiple DL subframes in the time domain and multiple DL CCs in the frequency domain) need to be allocated on one UE-specific (UL) CC during a single UL subframe. One can readily observe that such "full implicit resource allocation", as done in Rel-8, will result in an unacceptable resource consumption for the UE-specific CC.

It is pointed out that for the LTE-Advanced TDD system the ACK/NACK bundling will remain an important element, as in Rel-8 TDD, to ensure UL coverage. This will be the case especially for ACK/NACK on PUCCH format 1a/1b.

As discussed in 3GPP TSG RAN WG1 Meeting #60bis, R1-101886, Beijing, China, 12-16 Apr. 2010, Agenda item: 6.2.4.1, Source: Nokia, Nokia Siemens Networks, Title: "UL ACK/NACK Feedback in LTE-A TDD", for ACK/NACK feedback on PUCCH format 1a/1b in LTE-Advanced TDD the following options are promising:

ACK/NACK full bundling, as shown in FIG. 3;

ACK/NACK partial bundling: CC domain bundling plus channel selection, as shown in FIG. 4; and ACK/NACK partial bundling: time domain bundling plus channel selection, also as shown in FIG. 4.

Discussing now in greater detail the proposals made in R1-101886, it is said that CA introduces additional degree of freedom (compared to Rel-8 TDD) for PDCCH transmitted in DL. A consequence of this is that more ACK/NACK bits (e.g., up to 20 bits with 5 component carriers) need to be supported during one uplink subframe. More specifically, Rel-8 TDD supports at most 4 ACK/NACK bits (single component carrier) and, thus, 4 bits times 5 CCs=20 bits. In principle even more than 20 bits can be considered for certain TDD configurations. There are many TDD-specific issues which need to be taken into account with respect to ACK/NACK signaling, including what is the container used for multiple ACK/NACK bits, how to reduce the number of ACK/NACK bits in coverage limited cases, and how to handle PDCCH error cases.

For UL ACK/NACK feedback in LTE-A TDD, one UL subframe may be associated with multiple PDSCH transmissions in:

multiple CCs in frequency domain (depending on UE=s CC configuration), and multiple DL subframes in time domain (depending on configured TDD configuration).

It can be noted that for TDD, DL/UL asymmetry in the time-domain exists already in LTE Rel-8. Hence a set of mechanisms have already been specified to support ACK/NACK signaling corresponding to multiple DL subframes during a single UL sub-frame.

More specifically, in Rel-8 TDD both the PUSCH and PUCCH can carry ACK/NACK(s) corresponding to multiple DL subframes. The following modes have been specified.

ACK/NACK Bundling:

in this mode an "AND" operation is performed across multiple ACK/NACK bits within a "bundling window" per codeword, and will generate 1 or 2 bundled ACK/NACK bits for feedback. Such a mode is useful for coverage-limited UEs.

ACK/NACK Multiplexing:

in this mode an "AND" operation is performed across spatial code words (i.e., ACK/NACK spatial bundling), and ACK/NACK multiplexing is achieved via a channel selection method which allows an increase in DL throughput as compared to only the use of ACK/NACK bundling.

The switching between these modes is UE-specific and can be high-layer configured.

In Rel-8 TDD, so as to handle potential error cases due to ACK/NACK bundling, the Downlink Assignment Index (DAI) has been included into the UL grant and most of the DL grants. Related DAI encoding methods have been specified so as to balance error case handling, scheduling flexibility and other requirements.

As is further noted in R1-101886, in consideration of the fact that all of these mechanisms have undergone careful optimization during Rel-8 standardization, they can be retained as feasible solutions to signal multi-ACK/NACK feedback also in LTE-A. Hence, it is desirable that the existing mechanisms specified in Rel-8 TDD be reused as much as possible in LTE-A.

One proposal in R1-101886 is thus that the ACK/NACK feedback mechanisms specified in Rel-8 TDD should be reused as much as possible in LTE-A.

In LTE-A TDD the component carrier dimension increases the ACK/NACK payload compared to that of Rel-8 TDD. Hence, the PUCCH format 2 can be considered as an additional container for the increased number of ACK/NACK bits (in addition to PUCCH format 1a/1b and the PUSCH).

Based on the foregoing observations, it is further stated in R1-101886 that the following ACK/NACK modes/containers need to be considered in LTE-A TDD.

(A) As specified in Rel-8 TDD, PUCCH format 1a/1b could be used as the ACK/NACK container for small and medium ACK/NACK payload cases in LTE-A TDD. The following ACK/NACK feedback modes could be supported:

Full Bundling Mode:
  As in Rel-8 TDD, it is mainly used for a small number of ACK/NACK feedback bits.
  As in Rel-8 TDD, 1 or 2 bundled ACK/NACK bits will be generated via the "AND" operation across multiple ACK/NACKs.
  In LTE-A TDD, such a mode will (still) be meaningful for coverage-limited UEs and will serve as an ACK/NACK fallback mode.

Channel Selection Mode:
  As in Rel-8 TDD, it is mainly used for medium number of ACK/NACK bits (e.g., up to 4 bits).
  In LTE-A TDD, the channel selection mechanism specified in Rel-8 TDD can be fully utilized.
  In LTE-A TDD, further bundling may be needed to fit the ACK/NACK payload with the multiplexing capacity.

(B) In LTE-A TDD, PUCCH format 2 is a feasible ACK/NACK container for large ACK/NACK payloads.

(C) In LTE-A TDD, the switching between above modes could be UE-specific and higher-layer configured, as in Rel-8 TDD.

Furthermore, for ACK/NACK feedback the concurrent transmission of multiple PUCCH channels will result in a non-optimum cubic metric property, and thereby a significant increase in power consumption at the UE. Hence, ACK/NACK feedback should be based on a single PUCCH transmission instead of a concurrent transmission of multiple PUCCHs.

It is further proposed in R1-101886 that for LTE-A TDD the PUCCH format 1a/1b, PUCCH format 2, and PUSCH are considered as potential containers for ACK/NACK feedback signaling, that both full bundling and channel selection modes need to be supported with PUCCH format 1a/1b, and ACK/NACK feedback should be based on a single PUCCH transmission instead of concurrent transmission of multiple PUCCHs.

It is noted in R1-101886 that in Rel-8 TDD the ACK/NACK bundling had been specified to maximize the ACK/NACK coverage by means of spatial and time domain bundling.

In LTE-A TDD, ACK/NACK bundling is still an essential element for ACK/NACK feedback, especially when taking the limited container capacity and potential increased ACK/NACK overhead into account. Hence, the following bundling modes (and their combinations) should be considered as candidates to reduce the ACK/NACK feedback overhead in UL:

(A) Spatial Domain Bundling:
  As in Rel-8 TDD, the "AND" operation is performed across spatial code words and generates a bundled ACK/NACK result.
  From the ACK/NACK overhead perspective this effectively compresses the ACK/NACK overhead from the spatial domain.
  From the DL throughput perspective the loss can reduced.

(B) Time Domain Bundling:
  In Rel-8 TDD this of bundling has already been adopted for the "ACK/NACK bundling" mode,
  In LTE-A TDD, time domain bundling can be considered as well.

(C) CC Domain Bundling:
  The "AND" operation is performed across multiple configured CCs to generate the bundled ACK/NACK.
  From the ACK/NACK overhead perspective this effectively compresses the ACK/NACK payload in the CC domain.
  The ACK/NACK CC domain bundling outperforms ACK/NACK time domain bundling in terms of DL throughput, especially for cell-edge throughput.

It is further proposed in R1-101886 that in LTE-A TDD spatial domain bundling, time domain bundling, and CC domain bundling (and their combinations) can be utilized to reduce ACK/NACK overhead. ACK/NACK CC domain bundling can take priority from the DL throughput point of view.

In Rel-8 TDD, and accompanied with ACK/NACK bundling, the DAI approach has been included into DL/UL grants and the encoding method had been specified to handle potential error cases.

In LTE-A TDD the DAI is needed, as the DAI is still the essential element for UL ACK/NACK feedback in LTE-A TDD to handle related error cases due to DL grants missing within the "bundling window" (i.e., same motivation as exists in Rel-8 TDD). Further, in LTE-A TDD the "bundling window" may be extended to both the time domain and the CC domain.

As to the bit-width of the DAI field, in Rel-8 TDD the bit-width of DL/UL DAI is 2-bits. In LTE-A TDD a similar DAI bit-width is preferred to avoid additional TDD-specific overhead for most grants. Further, and with respect to a DTX to ACK probability requirement, in Rel-8 TDD in the case of ACK/NACK bundling a DTX to ACK error may occur due to a missing DL grant. The target DTX to ACK probability is set to be 1E-4. In Rel-10 TDD the same reliability level can be targeted.

Having thus summarized what is stated in R1-101886, it can be observed that for PUCCH format 1a/1b transmission with ACK/NACK bundling reserving PUCCH resources for each PDCCH is unnecessary since there will only be one (or two) ACK/NACK bit(s) generated within each bundling window. As a result only one PUCCH channel need be used for ACK/NACK transmission. This observation implies that a one-to-one mapping between PDCCH and PUCCH format 1a/1b allocation (as in LTE Rel-8) will result in excessive resource consumption, especially in a TDD system configured into the ACK/NACK bundling mode.

The exemplary embodiments of this invention provide effective methods to overcome the PUCCH format 1a/1b inefficiency allocation problem in the LTE-Advanced TDD system.

Previously there have been several methods proposed for ACK/NACK resource allocation/reservation in LTE-Advanced. However, these methods have focused primarily on the FDD system and not the TDD system.

One possible approach is to assume that the dynamic ACK/NACK space consists of two parts:
(a) the conventional dynamic ACK/NACK space as defined in LTE Rel-8; and
(b) a new dynamic cross-CC-ACK/NACK space.

In this approach it becomes possible to employ a multiple-to-one mapping between CCEs and ACK/NACK resources in the dynamic cross-CC PUCCH resource, which could be configured by higher protocol layers. This may be considered as a form of PUCCH format 1a/1b resource compression.

In 3GPP TSG RAN WG1 Meeting #59bis, R1-100243, Valencia, Spain, Jam 18-22, 2010, Source: Huawei, Title: "UL ACK/NACK resource allocation for carrier aggregation", it is stated that one can reserve M ACK/NACK resources for a total of N CCEs, where M<N. This can be considered for a linked but unpaired DL CC to reduce the implicit ACK/NACK resource overhead. A similar proposal was also made in 3GPP TSG RAN WG1 Meeting #59bis, R1-100363, Valencia, Spain, 18-22 Jan. 2010, Source: Panasonic, Title: "PUCCH resource allocation for carrier aggregation".

The above mentioned PUCCH format 1a/1b resource compression (i.e., the multiple-to-one mapping between CCEs and PUCCH resource) is achieved via both implicit and explicit signaling, and may introduce additional scheduling constraints in order to obtain more efficient resource compression. This approach is not, however, optimum for use in the LTE-Advanced TDD system. That is, in the TDD system there is more freedom for ACK/NACK resource mapping since there can be a mapping from multiple CCs and multiple DL subframes to one UE-specific CC during one UL subframe. In addition, and as was discussed above, the ACK/NACK bundling operation provides a new property for PUCCH format 1a/1b resource allocation that can be utilized for efficient resource compression.

In accordance with the exemplary embodiments of this invention there is provided an efficient technique to accommodate PUCCH format 1a/1b resource allocation in the LTE-Advanced TDD system supporting CA.

Figure 2:
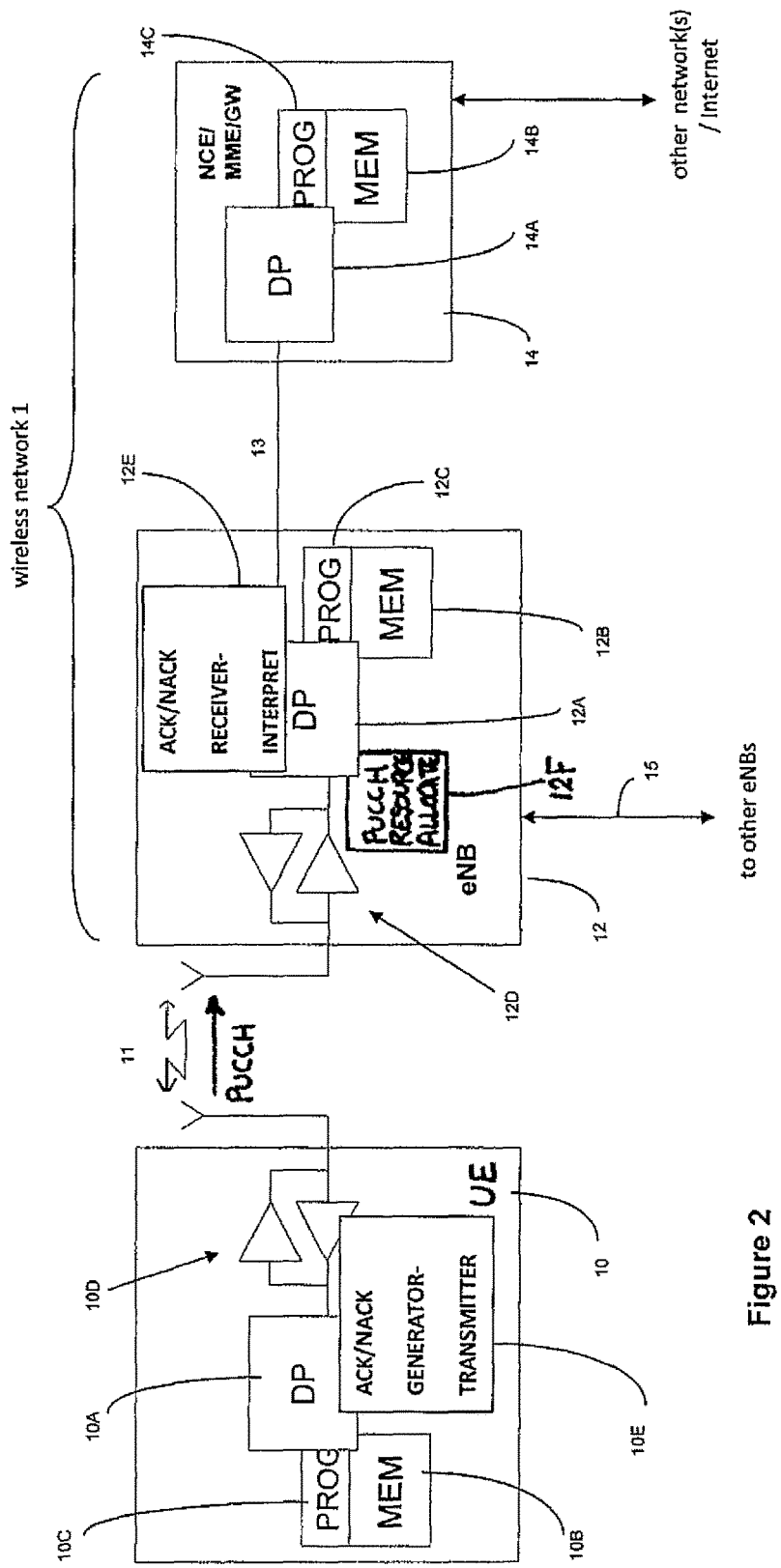
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transceiver 10D for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

For the purposes of describing the exemplary embodiments of this invention the UE 10 may be assumed to also include an ACK/NACK generation and transmission unit or module or function 10E that operates in accordance with the exemplary embodiments of this invention, and the eNB 12 includes a complementary ACK/NACK receiving and interpretation unit or module or function 12E. The eNB 12 also includes a PUCCH resource allocation unit or module or function 12F that operates as described below.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware). For example, the ACK/NACK generation and transmission unit or module or function 10E, the ACK/NACK receiving and interpretation unit or module or function 12E and the PUCCH resource allocation unit or module or function 12F can each be embodied as hardware, or as executable code/software stored in the memories 10B and 12B, or as a combination of executable code/software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable MEMs 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

Turning now to a more detailed description of the exemplary embodiments of this invention, for PUCCH format 1a/1b resource allocation in LTE-Advanced TDD the PUCCH format 1a/1b resources are reserved with the granularity of one "ACK/NACK bundle". An "ACK/NACK bundle" can be interpreted to mean a set of TDD-subframe(s) and component carrier(s) that are configured to form a subset of ACK/NACK feedback to be sent in the UL as a response to received data (PDSCH) in the DL. By "configured to form a subset of ACK/NACK feedback" what is meant is that the configuration is, in a typical (and non-limiting) application: made by the eNB 12, realized using RRC signaling between the eNB 12 and the UE 10, and is semi-static by nature.

To generalize this concept, the number of PUCCH format 1a/1b resources reserved for each "ACK/NACK bundle" can be pre-defined or configured by a higher protocol layer. The exact value can be different for different ACK/NACK feedback/bundling schemes.

For example, the total number of PUCCH format 1a/1b resources allocated to a given UE 10 by PUCCH resource allocation unit 12F depends on the adopted ACK/NACK bundling scheme and the number of "ACK/NACK bundles". More specifically, the total number of PUCCH format 1a/1b resources allocated to a given UE 10 scales with the number of "ACK/NACK bundles", which in turn depends on a UE-specific configuration.

With respect to resource allocation, the positions of PUCCH format 1a/1b resources allocated to a given UE 10 are derived in a predetermined manner based on implicit or explicit resource allocation signaling (or a combination of implicit and explicit resource allocation signaling).

Furthermore, the starting position of PUCCH format 1a/1b resources allocated to a given UE 10 is indicated explicitly by means of RRC signaling, or alternatively is indicated in an implicit manner by means of some other UE-specific parameters (e.g., introducing a relationship between ACK/NACK resources and the starting position of a UE-specific search space).

The "UE-specific search space" corresponds to a pre-defined set of control channel elements (CCE) available to transmit PDCCH for a certain UE (there is a one-to-one mapping between the first CCE and the PUCCH ACK/NACK resource in LTE Rel-8). The entire CCE-space (from a single UE perspective) is divided into (i) a common search space (available to all UEs), (ii) a UE-specific search space (available to a given UE), and a search space which is not available at all to the given UE.

With respect to the number of allocated PUCCH format 1a/1b resources for different ACK/NACK bundling schemes, several methods can be used to support "ACK/NACK full bundling" and "ACK/NACK time-domain bundling/CC-domain bundling plus channel selection", as discussed in the above-referenced R1-101886.

For example, and for the case of ACK/NACK full bundling (i.e., a single "ACK/NACK bundle"), the number of allocated PUCCH format 1a/1b resources can be pre-defined or higher-layer configured.

Figure 5A:
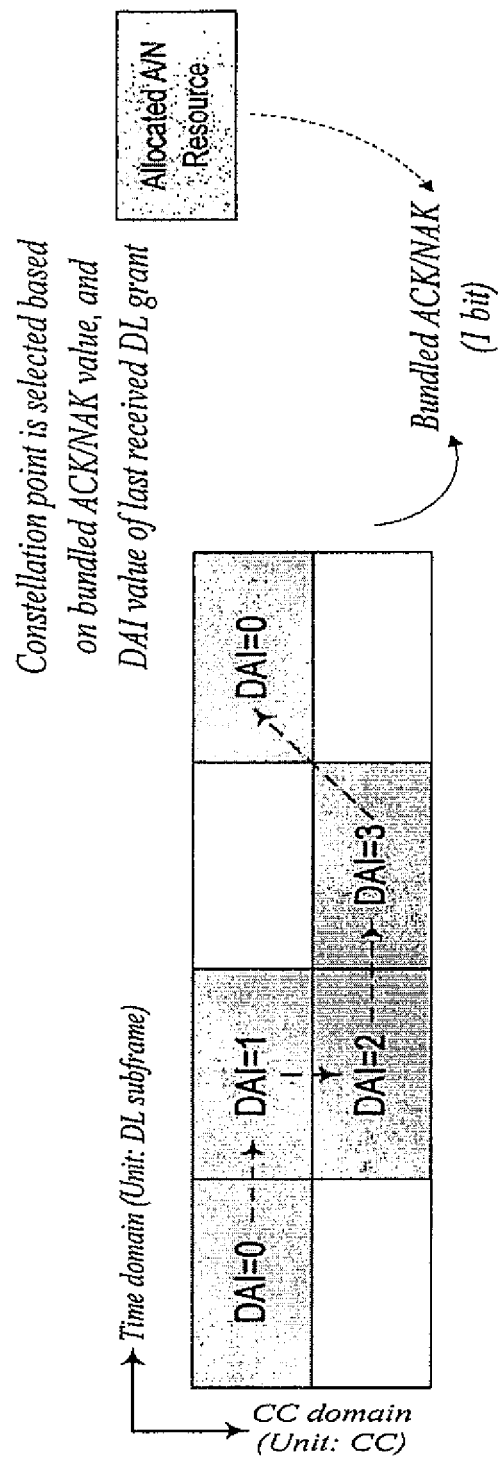
FIG. 5A shows a first embodiment of PUCCH format 1a/1b resource allocation for ACK/NACK full bundling.

Referring to FIGS. 5A and 5B (discussed in further detail below), in a first embodiment a single PUCCH format 1a/1b resource is allocated to a given UE 10 by the PUCCH resource allocation unit 12F, and the bundled ACK/NACK result is then sent by the ACK/NACK generator and transmitter 10E via the allocated resource. Further, ACK/NACK bundling across spatial codewords can be applied. Furthermore, constellation point selection based on the value of the bundled ACK/NACK bit and the DAI of the last received PDCCH within the bundling window can be applied.

In a second embodiment (referring to FIG. 5C) multiple PUCCH format 1a/1b resources are allocated to a given UE 10, and the resource selected to send the bundled ACK/NACK result depends on the DAI value of the last received PDCCH within the bundling window.

Further by example, and for the case of ACK/NACK time-domain bundling and/or CC-domain bundling plus channel selection, one PUCCH format 1a/1b resource is allocated per "ACK/NACK bundle". Therefore, the total number of PUCCH format 1a/1b resources allocated to a given UE 10 depends on the number of configured "ACK/NACK bundles".

Channel selection is performed among multiple allocated PUCCH format 1a/1b resources, and is used to convey generated (bundled) ACK/NACK results.

Described now are exemplary rules that can be used for implicit resource allocation.

In the LTE-Advanced TDD system the position of PUCCH format 1a/1b resources allocated to a given UE 10 are determined in a pre-defined manner as follows:

$f(UE_{para}, RA_{index})$, where $UE_{para}$ is a UE-specific parameter, which is decided by RRC signaling, or other UE-specific parameters (e.g., the start position of UE-specific search space).

$RA_{index}=1, \ldots, M$, where M is the total number of PUCCH format 1a/1b resources allocated to a given UE 10, and M corresponds to the number of ACK/NACK bundles (which may be pre-defined or higher-layer configured).

As an exemplary implementation, $f(UE_{para}, RA_{index})$ can have the following form:

$$f(UE_{para}, RA_{index}) = (N_{PUCCH} + M \cdot UE_{para} + RA_{index}) \bmod C, \text{ or}$$

$$f(UE_{para}, RA_{index}) = N_{PUCCH} + (M \cdot UE_{para} + RA_{index}) \bmod C,$$

where "·" means a "multiply" operation, where "mod" is modulo, and were $N_{PUCCH}$ and C are values defined by the PUCCH resource allocation unit 12F of the eNB 12.

For ACK/NACK full bundling one exemplary implementation is such that (as shown in FIG. 5A):
  a single PUCCH format 1a/1b resource is allocated to a given UE 10.
  ACK/NACK bundling across spatial codewords is applied (one bundled ACK/NACK bit per received CC/subframe is generated).
  Constellation point selection based on the value of the bundled ACK/NACK bit and the DAI of the last received PDCCH within the bundling window is applied, as shown in the table of FIG. 5B.

Figure 5C:
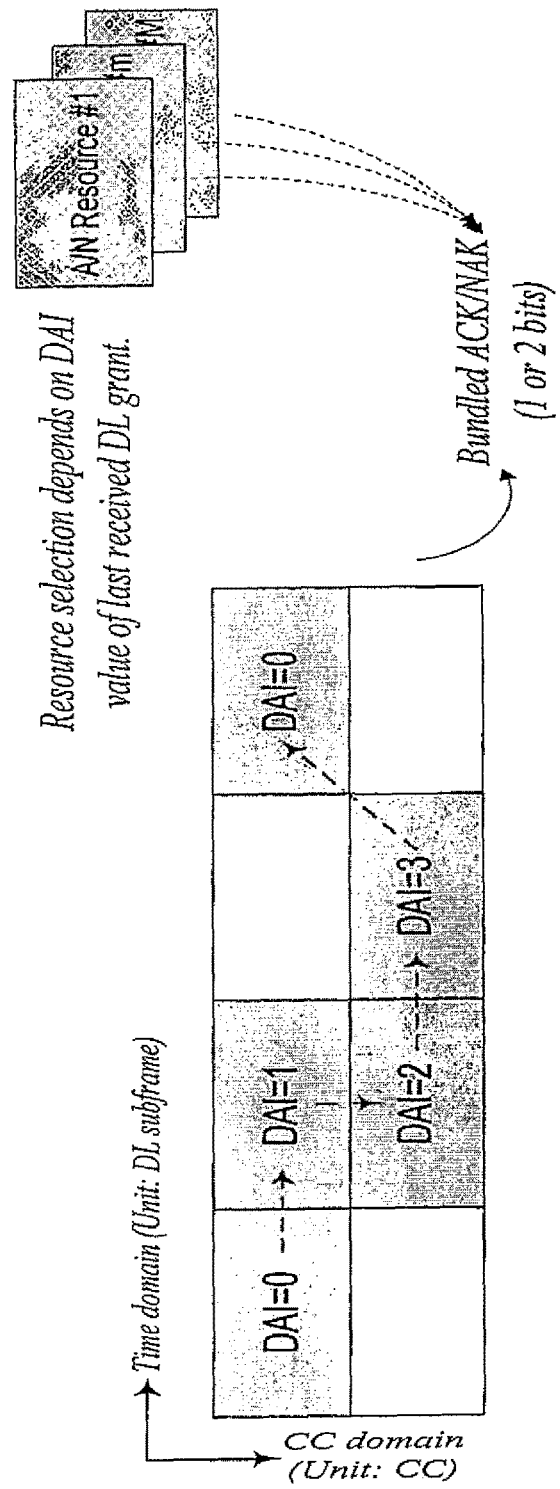
FIG. 5C shows a second embodiment of PUCCH format 1a/1b resource allocation for ACK/NACK full bundling.

For ACK/NACK full bundling another exemplary implementation is such that (as shown in FIG. 5C):
  The number of allocated PUCCH format 1a/1b resources to a given UE 10 is pre-defined or higher-layer configured (denoted as M).
  The resource used to send the bundled ACK/NACK results depends on the DAI value of last received PDCCH within the bundling window.
  One implementation is (n mod M) PUCCH format 1a/1b resource is used to convey the bundled ACK/NACK result, where n is the DAI value of the last received PDCCH, and M is the total number of PUCCH format 1a/1b resource allocated to the UE 10 by the PUCCH resource allocation unit 12F of the eNB 12.

The DAI encoding principle depicted in FIGS. 5A and 5C is explained in further detail in copending U.S. patent application Ser. No. 12/497,434, filed Jul. 2, 2009, by the same inventors of this patent application and entitled: "System and Method for ACK/NACK Feedback in TDD Communications", referred to below as the "commonly owned application". The DAI encoding principle in accordance with the commonly owned application will be briefly summarized herein with reference to FIGS. 6-10.

In 3GPP TSG RAN WG1 meeting #56bis, R1-091526, Seoul, Korea, 23-27 Mar. 2009, Source: CATT, "UL ACK/NACK transmission in LTE-A", the concept of CC grouping is described. A number of DL component carriers and TDD subframes are arranged to form C groups; c1, c2, c3, c4, in a predefined way. These C groups are then configured to generate group-specific ACK/NACK/DTX information based on up to M input bits per group. The group specific ACK/NACK/DTX information is generated by means of bundling or multiplexing of ACK/NACK bits corresponding to different component carriers CCs, TDD subframes, and spatial layers within the group. Regardless of the grouping shown in FIG. 6, (UL/DL) resource allocation grants transmitted on PDCCH corresponding to PDSCH(s) of different component carriers and TDD subframes may be separately encoded.

Figure 6:
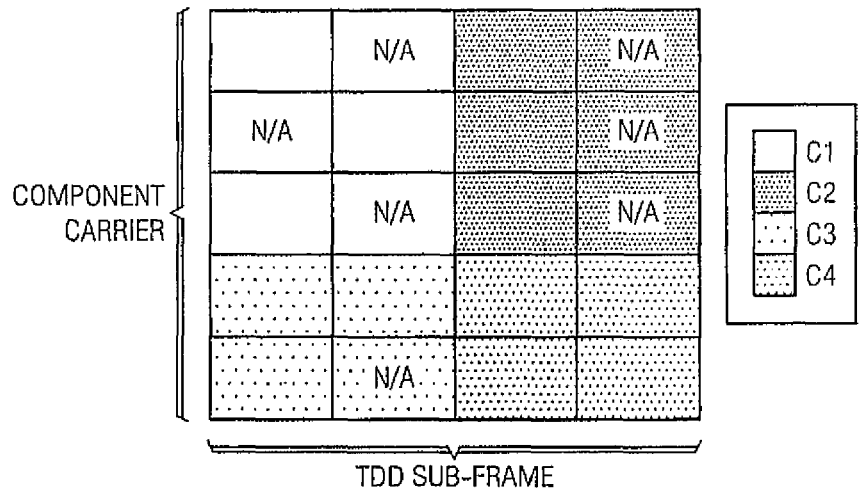
FIG. 6 illustrates a conventional CC and TDD subframe grouping.

FIG. 6 illustrates the grouping concept. On the component carriers, C groups c1, c2, c3, and c4 are shown with different shading, and the TDD subframes are shown running left to right in the figure. NAK/ACK message information is shown in different TDD subframes on the component carriers, for the groups c1-c4, labeled N/A. Embodiments of the invention in accordance with the commonly owned application use this grouping concept as further detailed below.

Conventional approaches proposed do not contemplate the ACK/NACK signaling needed to support LTE-A. Specifically, the prior art approaches do not provide the ACK/NACK uplink signaling that takes into account the error case handling needed for separate PDCCH UL and DL grants when these dedicated resource allocation grants correspond to different component carriers (CCs) and TDD subframes.

Embodiments of the invention in accordance with the commonly owned application provide features which may be used together to perform ACK/NACK signaling on PUCCH for LTE-A systems while addressing the error cases. In one embodiment, a novel DAI encoding is provided for the aggregated CC case as used in LTE-A. In one embodiment method, an intra-group encoding approach for DAI is used. In an alternative embodiment method, an inter-group encoding method for DAI is used. In both of these embodiments two DAI bits are included in the PDCCH downlink grant. The use of the DAI encoding in the downlink grant enables the UE 10 and the eNB 12 to handle error cases related to the grouping of ACK/NACK feedback signals corresponding to multiple CCs and TDD subframes. These error cases occur when a CC/TDD subframe specific PDCCH downlink grant allocation is not correctly received by the UE 10. Without the DAI encoding of the invention in accordance with the commonly owned application, the UE and eNB would not be able to correctly handle these errors.

In another aspect of the invention in accordance with the commonly owned application, embodiments provide for arranging the ACK/NACK signal feedback on the PUCCH on top of the configurable grouping. In one embodiment scheme, a semi-static grouping is used. In an alternative embodiment a dynamic grouping is used. The ACK/NACK signals are then transmitted on the UL to report the results of previous DL transmissions.

Figure 7:
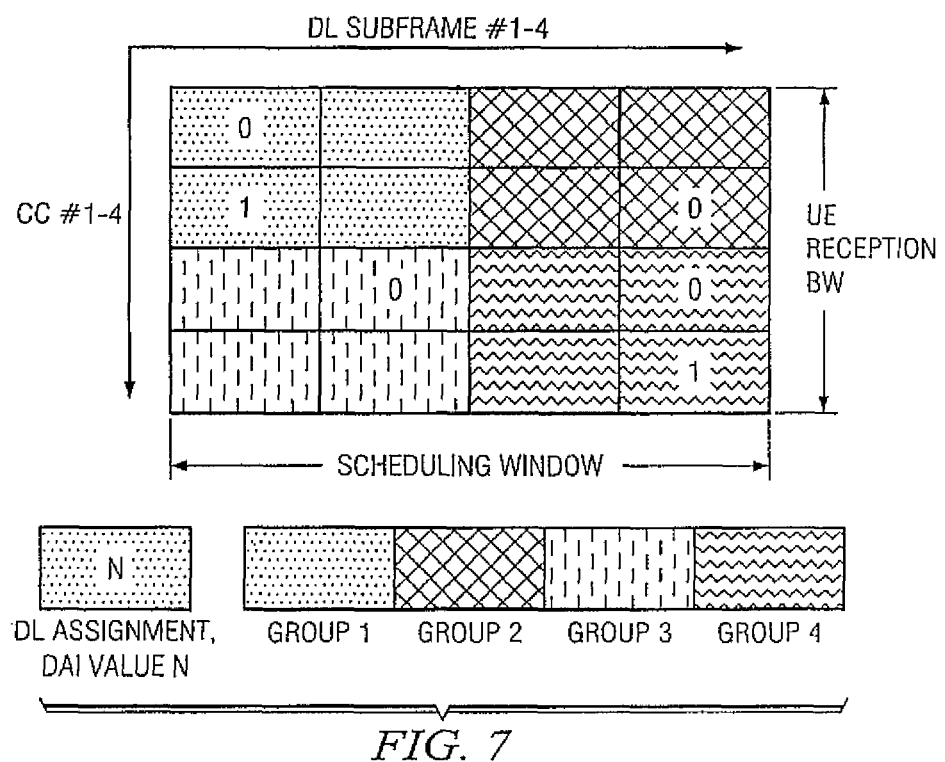
FIG. 7 illustrates an exemplary embodiment of a DAI value encoding.

FIG. 7 presents in a simple diagram a method for encoding the DAI in the "intra-group" embodiment method. In this exemplary embodiment the DAI encoding is group specific; that is, the DAI encoding begins again with each group. In the embodiment a DAI counter is used where the count is equal to the number of previous grants within the group. For each group, the DAI counter is incremented from 0, 1, . . . $N_i$–1 where $N_i$ is the number of DL grants within the $i^{th}$ group. The DAI counter is numbered first in the frequency domain and in the time domain for each group and the number begins at 0.

Equation 1 expresses the value of the DAI Counter.

$$DAICounter = 0, 1, 2, \ldots N_i-1; \text{ where } N_i = \text{number of DL grants in the } i\text{th group} \quad (1).$$

The DAI Value is then obtained by applying a modulo operation; here, MOD 4 is used.

Equation 2 provides an expression for this step:

$$DAIValue = DAICounter \text{ MOD } 4 \quad (2)$$

FIG. 7 illustrates a non-limiting, exemplary case example of the method in application. Here, there are 4 CCs and 4 subframes divided into 4 groups. There are 2, 1, 1 and 2 DL grants in the 4 groups, respectively. The groups are indicated as Group 1, Group 2, Group 3, and Group 4 by shading in FIG. 7.

For the first group, the first DL grant has no predecessor so the count is 0. For the second DL grant in the first group, the count is 1. In group 2, there is only 1 DL grant, so it receives a DAI count of 0. Similarly, in group 3, there is only 1 DL grant and it too receives a count of 0. In Group 4, the first DL grant starts at count 0, and then the second DL grant receives a DAI count of 1. Since the MOD 4 operation does not change the count values in this example, the DAI Values are shown as 0, 1 for Group 1, 0 for Group 2, 0 for Group 3 and 0, 1 for Group 4, respectively.

In an alternative embodiment method for DAI encoding in accordance with the invention of the commonly owned application, "inter-group" encoding is used. In this approach the DAI counter starts at 0 and increments to the total number of DL grants within the UE reception bandwidth for the frequency domain and within the scheduling window for the time domain. That is, the DAI counter is not reset for each group. Thus, the DAI counter=0, 1, 2 . . . N–1, where N is the total DL grants observed for all the groups. Equation 3 provides a simple expression. After the DAI count is determined, a MOD 4 operation is performed to obtain a DAI value. Equation 4 provides this expression.

$$DAICounter = 0, 1, 2 \ldots N-1 \text{ Where } N \text{ is the total number of DL grants} \quad (3).$$

$$DAIValue = DAICounter \text{ MOD } 4 \quad (4)$$

Figure 8:
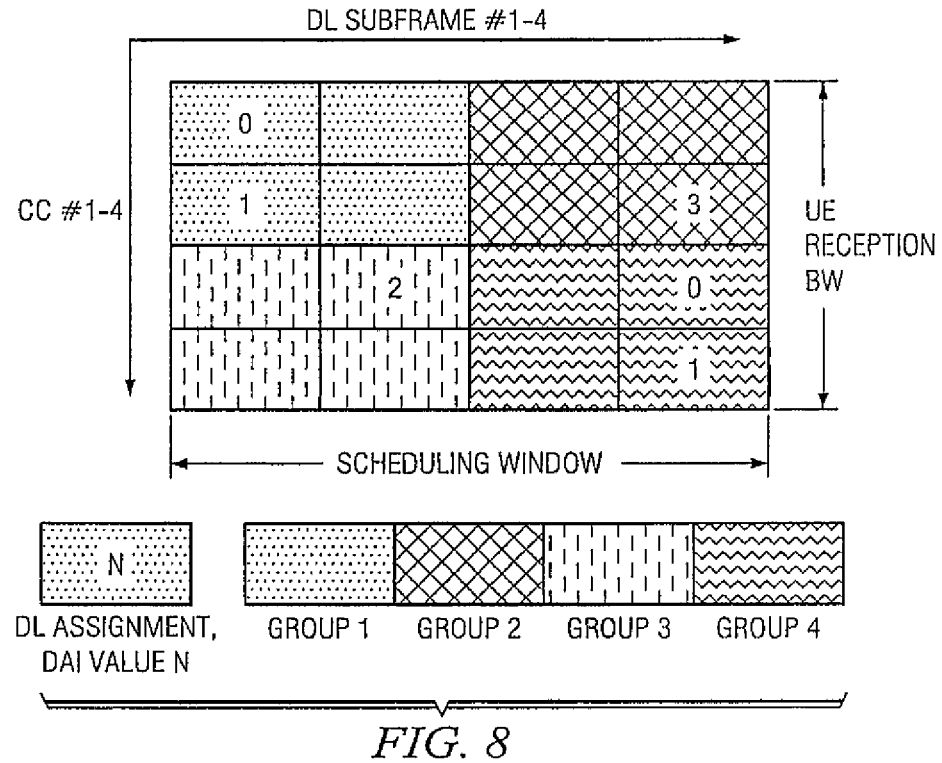
FIG. 8 illustrates another exemplary embodiment of DAI value encoding.

In FIG. 8, an example of the application of this embodiment is shown for a non-limiting illustrative case. In FIG. 8 four groups are again shown in the scheduling window, with 4 component carriers and 4 TDD subframes. The groups are indicated by shading Group 1, Group 2, Group 3, and Group 4. The numerical values shown in some blocks represent the DAI value determined using the inter group method embodiment, as follows.

For Group 1, there are two DL grants. For Group 2, there is one downlink grant. For Group 3, there is one DL grant and for Group 4, there are two DL grants. Thus, in this illustrative case, there are a total of 6 DL grants. Using the inter group method for the DAI counter, the counter will be incremented from 0 . . . 5. Applying the DAI value method step of using MOD 4, then the DAI values shown in FIG. 8 are obtained, e.g. 0, 1 for Group 1; 2 for group 2, 3 for Group 3, and 0, 1 for Group 4. These values are depicted in the appropriate CC/TDD subframe block of FIG. 8.

The DAI encoding schemes of the two alternative embodiments are shown in FIGS. 7 and 8. Because the DAI encoding schemes are still formed as DAI values of 2 bits, there is no backwards compatibility problem with using systems compliant with LTE Rel-8 in TDD mode. The use of the embodiments of the invention in accordance with the commonly owned application is compatible with the use of Rel-8 equipment.

In another aspect of the embodiments of the invention in accordance with the commonly owned application, methods are disclosed for providing the feedback of the ACK/NACK information. Two alternate method embodiment approaches are provided that address the trade-off between system throughput (efficiency) and UL coverage in the LTE-A system in TDD mode.

In one method embodiment, semi-static grouping is used to provide the ACK/NACK feedback. In this approach C groups and M subgroups are defined by higher layer operations. This information may be transmitted to the UE as control bits in an initialization message. This approach may be used in conjunction with either the inter group or the intra group DAI encoding scheme described above.

In an alternative method embodiment dynamic grouping for ACK/NACK feedback may be used. In this embodiment, C groups and M subgroups are formed according to parameters C and M that are signaled to the UE by the eNB. These parameters may be either cell-specific or UE-specific. The group division between CCs and subframes may be made in a pre-defined way. As one approach, which is non-limiting, there may be C+ groups. Each C+ group contains $\lceil N/C \rceil$ consecutive ACK/NACK bits and C− groups, each contains $\lfloor N/C \rfloor$ consecutive ACK/NACK bits, where N is the total number of DL grants observed at the UE 10 and C+=N mod C, and C_=C−C+. The operation $\lceil N/C \rceil$ is a ceiling operation; that is, $\lceil 5/2 \rceil=3$, for example. The operation $\lfloor N/C \rfloor$ is a floor operation; that is, $\lfloor 5/2 \rfloor=2$, for example.

After the grouping has been configured, the UE may transmit the ACK/NACK information according to the following steps:

Step #1: Within each subgroup, ACK/NACK bits are first bundled in the spatial/CC/time domain to generate M ACK/NACK feedback bits.

Step #2: A channel selection technique is applied to carry M ACK/NACK feedback bits per group. In the alternative some other technique is used to carry M ACK/NACK feedback bits per group.

Step #3: After the channel is selected, the UE transmits ACK/NACK/DTX feedback corresponding to C parallel groups, on the selected or predefined channels.

Figure 9:
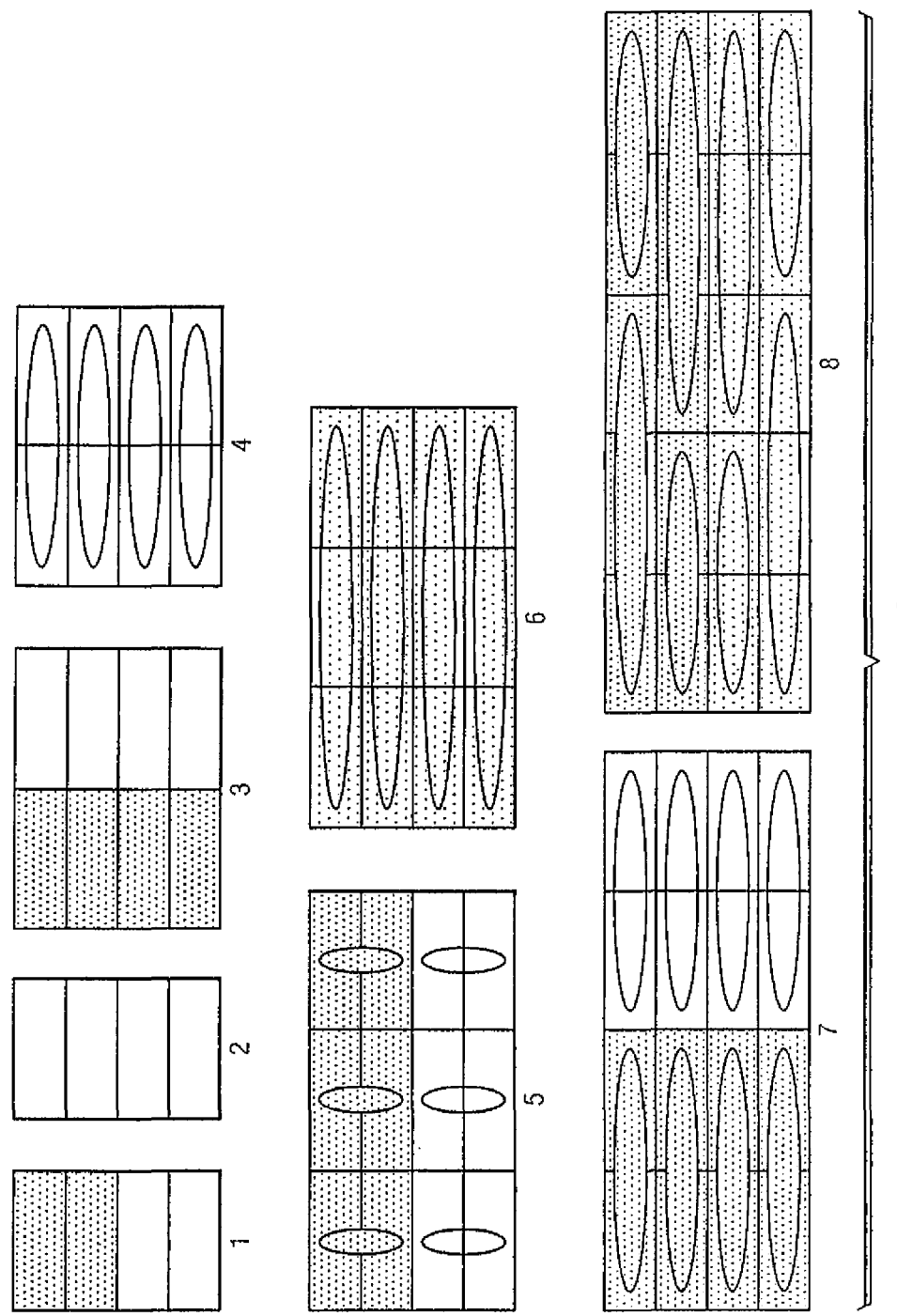
FIG. 9 illustrates patterns used for ACK/NACK signaling.

FIG. 9 illustrates various configurations 1-8 of pre-defined grouping patterns that are combined with the embodiment ACK/NACK signaling scheme for providing feedback of the ACK/NACK information from the UE, on the PUCCH for example. The shading indicates different groups and the circle shape indicates the subgroups in which domain the ACK/NACK bundling is applied. For example, for configuration 7, 2 groups and 4 subgroups per group are configured. Within each group four ACK/NACK/DTX feedback information is generated via ACK/NACK bundling within each subgroup. Then channel selection is performed within each group to carry four ACK/NACK/DTX feedback signals. Finally, all ACK/NACK/DTX feedback signals are sent via parallel selected PUCCH format 1b channels.

Figure 10:
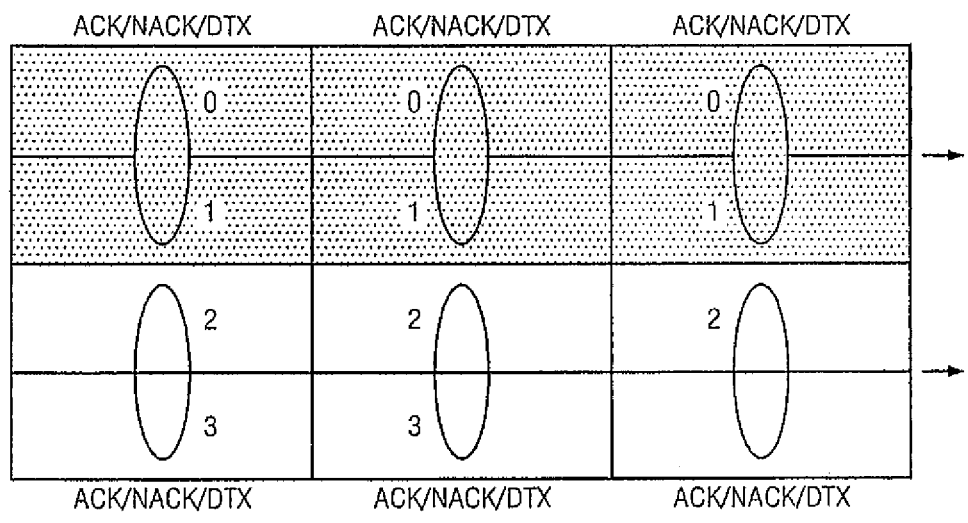
FIG. 10 illustrates in detail one of the ACK/NACK signaling patterns of FIG. 9.

FIG. 10 depicts in a more detailed view the pattern 5 of FIG. 9. In FIG. 10, DAI encoding for "inter group" was applied. ACK/NACK bits corresponding to all of the observed DL grants (observed by the UE 10) are arranged into 2 groups and 3 subgroups per group as shown in FIG. 10. Each subgroup provides one ACK/NACK/DTX state indication by the use of ACK/NACK bundling. To transmit this information, proper channel and QPSK constellation point selection (or encoding scheme in general) is done within each group to carry ACK/NACK feedback corresponding to 3 subgroups. Finally, the ACK/NACK/DTX feedback information corresponding to the 2 groups will be transmitted in parallel using two PUCCH Format 1b channels, or using another encoding scheme corresponding to 2 groups. The 2 arrows of FIG. 10 indicate an uplink transmission in parallel (contemporaneously in time) on the 2 channels.

There is a need for error handling when the UE does not observe correctly all of the DL grants transmitted by the eNB. There is a risk that the bundled ACK signal is generated while the last N DL grants are missed at the same time. As an example, consider a case where 10 DL assignments within one "scheduling window" are scheduled, then the 2 bits for the DAI values will be 0, 1, 2, 3, 0, 1, 2, 3, 0, 1, respectively. If the UE only observes or receives the first 7 DL grants and the last 3 are missed, then from the UE side, it will observe 7 DL grants with DAI values 0, 1, 2, 3, 0, 1, 2. Since the DAI indexes are continuous in this example, the UE will not be aware of the missed detection of the other 3 DL grants.

In this error case the uplink ACK/NACK bundled signals transmitted do not correspond to the true ACK information. The following method embodiments are provided as embodiments of the invention in accordance with the commonly owned application that may be used to handle this error situation, known as a "DTX to ACK" error situation.

First, as a simplifying case assumption, the most likely case is that the last DL grant is missing. The possibility of the last N continuous DL grants missing is much lower, so that case is not treated here.

In one embodiment, the UE indicates the last received PDCCH DL grant explicitly by always using the PUCCH resource corresponding to the last received DL grant. This approach or implementation embodiment is suitable for at least the ORT (orthogonal resources transmission) case for PUCCH diversity with multiple antennas. In this signaling diversity approach, the UE will utilize PUCCH diversity based on the usage of multiple PUCCH format 1a/1b resources. In such a case, the UE can select the PUCCH resource that corresponds to the last observed or received DL grant, thus the eNB receiving the PUCCH knows which one is the last received DL grant by the UE.

This approach or implementation embodiment is also suitable for at least the SCTD (Single-carrier transmit diversity) case for PUCCH diversity with multiple antennas. SCTD is also referred to as the ORT scheme in 3GPP Ran1 discussions. In SCTD or ORT, diversity gain is achieved via transmitting the same PUCCH information from multiple antennas at the UE with orthogonal PUCCH resources. This scheme is under consideration as one candidate transmit diversity scheme for PUCCH channel in LTE-A. In such a case, multiple orthogonal PUCCH channels are needed for the multiple antennas. In this embodiment method for implicitly signaling the last received DL grant, the UE can select the PUCCH resource that corresponds to the last observed or received DL grant and use it as one PUCCH channel required by ORT transmission. Upon receiving the PUCCH, the eNB receiving the PUCCH knows which DL grant is the last received DL grant by the UE. For example, in a non-limiting illustration assume there are C=1 groups and the UE has 2 antennas, then in the ORT case, the UE can select the PUCCH channel for one antenna according to the channel selection of the M subgroups, while selecting the PUCCH channel for the other antenna according to the last received DL grants.

In another alternative approach the UE indicates the DAI value 'V' of the last received PDCCH within each group implicitly, via a channel selection.

In this alternative approach, the UE makes a PUCCH resource selection (that the UE is otherwise free to select from any one of the PDCCH channels within the selected subgroup) in a manner that indicates implicitly the value V. On receiving the UL signals, the eNB will know which is the last-observed DL grant at the UE side, and the eNB and the UE will have a common understanding about the status of the received DL grants.

To perform this selection, one subgroup is selected, via channel selection, within each subgroup. For an illustrative example, if the DAI of the last received DL grant is 2, then the UE can select the third resource within the selected subgroup to send the ACK/NACK results. In this way, the eNB will know which DL grant is the last one the UE received safely.

Thus, the embodiments of the invention in accordance with the commonly owned application provide at least two methods for performing DAI encoding, several methods for providing ACK/NACK feedback, and methods for transmitting the information. These embodiments may be used to provide error handling and ACK/NACK support for LTE-A systems using TDD and the aggregated CCs on the PUCCH channels while remaining fully compatible with Release 8 of the LTE standards, because for example, the DAI value remains at two bits. Also, no "predication scheduling" is required in the time domain, as the CC first "pure counter" encoding of the DAI counter is used.

The methods described in accordance with the commonly owned application also provide a means to handle the "last DL grant missing" in various alternative embodiments.

The methods described in accordance with the commonly owned application also provide embodiments for the ACK/NACK feedback from the UE using either semi-static grouping or dynamic grouping. The semi-static grouping is determined at higher levels; the scheduler can then direct the HE to use the appropriate pattern in order to improve ACK/NACK feedback efficiency while considering traffic, signal strength and quality, etc. In dynamic grouping, the pattern used at the UE side is based on assignments each time to further improve the ACK/NACK efficiency. However, the dynamic approach may require DAI signaling in the UL messages, thus increasing the use of resources in the signaling traffic and increasing the complexity of the UE.

It should be noted that the DAI encoding described above with reference to FIGS. 6-10 represents but several exemplary and non-limiting approaches for providing the DAI encoding with respect to FIGS. 5A and 5C of the exemplary embodiments of this invention.

The use of the exemplary embodiments of this invention provides a number of technical effects and advantages.

For example, the use of the exemplary embodiments of this invention provides an increased PUCCH resource efficiency by avoiding unnecessary PUCCH resource allocations. Further, the chance of resource collisions is reduced and controllable by the eNB 12. Further, the signaling overhead for resource allocation is reduced. In addition, the exemplary embodiments are compatible with channel selection and ACK/NACK bundling modes, such as those discussed above with respect to R1-101886, as well with the full ACK/NACK bundling mode discussed in R1-101886.

Figure 11A:
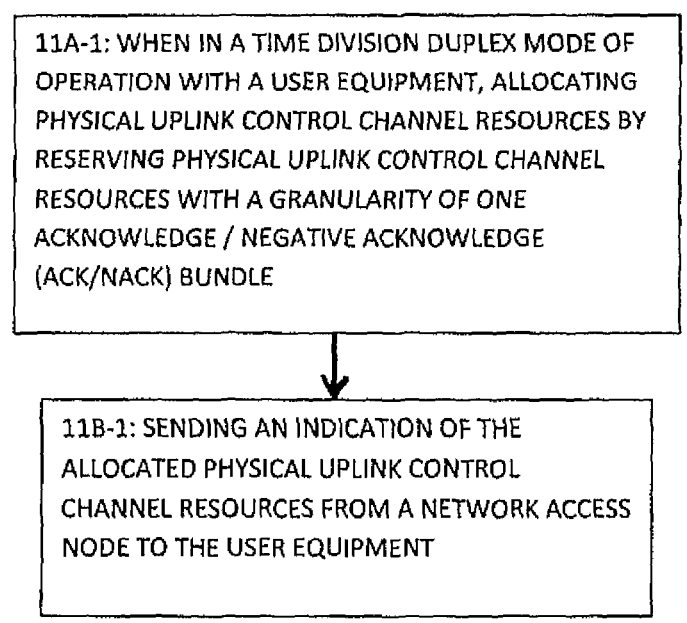
FIGS. 11A, 11B and 11C, collectively referred to as FIG. 11, are each a logic flow diagram that illustrates the operation of a method, and a result of execution of computer program instructions embodied on a computer readable medium, in accordance with the exemplary embodiments of this invention.

FIG. 11A is a logic flow diagram that illustrates the operation of a method, and a result of execution of computer program instructions, in accordance with the exemplary embodiments of this invention. In accordance with these exemplary embodiments a method performs, at Block 11A-1, a step when in a time division duplex mode of operation with a user equipment of allocating physical uplink control channel resources by reserving physical uplink control channel resources with a granularity of one acknowledge/negative acknowledge (ACK/NACK) bundle. In Block 11B-1 there is a step of sending an indication of the allocated physical uplink control channel resources from a network access node to the user equipment.

Figure 11B:
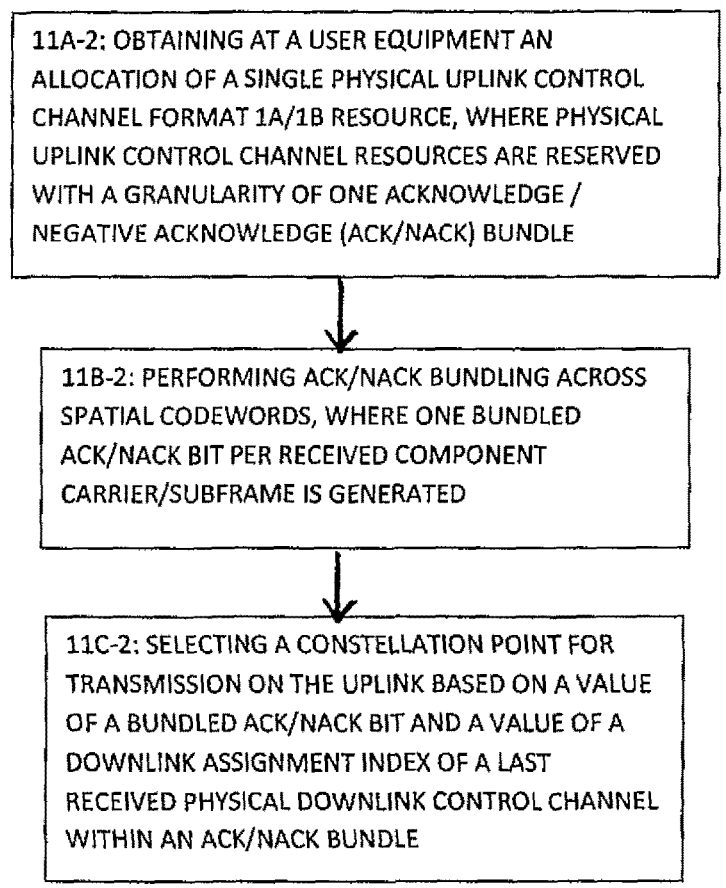

FIG. 11B is a logic flow diagram that illustrates the operation of another method, and a result of execution of computer program instructions, further in accordance with the exemplary embodiments of this invention. In accordance with these exemplary embodiments a method performs, at Block 11A-2, a step of obtaining at a user equipment an allocation of a single physical uplink control channel format 1a/1b resource, where physical uplink control channel resources are reserved with a granularity of one acknowledge/negative acknowledge (ACK/NACK) bundle. At Block 11B-2 there is a step of performing ACK/NACK bundling across spatial codewords, where one bundled ACK/NACK bit per received component carrier/subframe is generated. At Block 11C-2 there is a step of selecting a constellation point for transmission on the uplink based on a value of a bundled ACK/NACK bit and a value of a downlink assignment index of a last received physical downlink control channel within an ACK/NACK bundle.

Figure 11C:
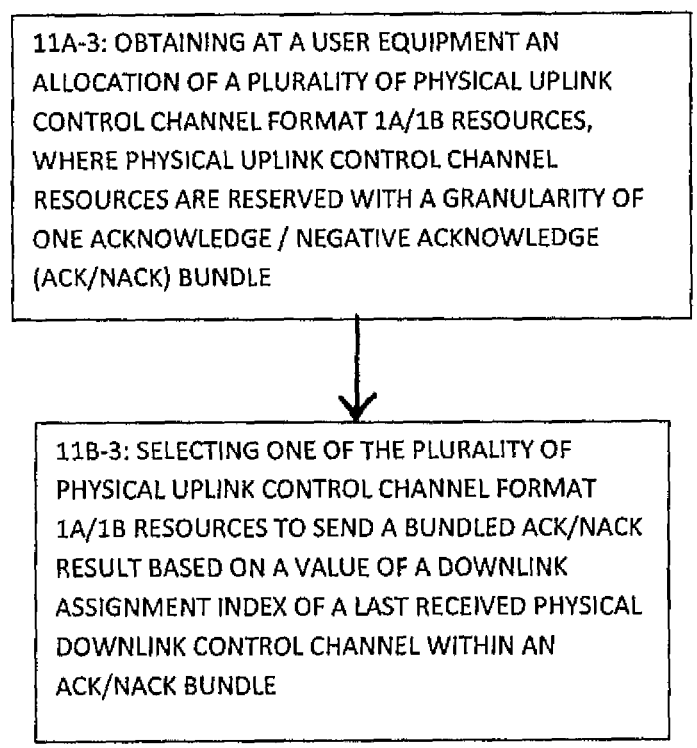

FIG. 11C is a logic flow diagram that illustrates the operation of a further method, and a result of execution of computer program instructions, also in accordance with the exemplary embodiments of this invention. In accordance with these exemplary embodiments a method performs, at Block 11A-3, a step of obtaining at a user equipment an allocation of a plurality of physical uplink control channel format 1a/1b resources, where physical uplink control channel resources are reserved with a granularity of one acknowledge/negative acknowledge (ACK/NACK) bundle. At Block 11B-3 there is a step of selecting one of the plurality of physical uplink control channel format 1a/1b resources to send a bundled ACK/NACK result based on a value of a downlink assignment index of a last received physical downlink control channel within an ACK/NACK bundle.

The various blocks shown in FIG. 11 may be viewed as method steps, and/or as operations that result from operation of computer program code, and/or as a plurality of coupled logic circuit elements constructed to carry out the associated function(s).

The exemplary embodiments also encompass apparatus of a type having at least one processor and memory including computer program code, where the memory and computer program code are configured to, with the processor, cause the apparatus at least to, when in a time division duplex mode of operation with a user equipment, allocate physical uplink control channel resources by reserving physical uplink control channel resources with a granularity of one acknowledge/negative acknowledge (ACK/NACK)

bundle; and send an indication of the allocated physical uplink control channel resources from a network access node to the user equipment.

The exemplary embodiments also encompass apparatus that comprises means, responsive to operation in a time division duplex mode of operation with a user equipment, for allocating physical uplink control channel resources by reserving physical uplink control channel resources with a granularity of one acknowledge/negative acknowledge (ACK/NACK) bundle; and means for sending an indication of the allocated physical uplink control channel resources from a network access node to the user equipment.

The exemplary embodiments also encompass apparatus of a type having at least one processor and memory including computer program code, where the memory and computer program code are configured to, with the processor, cause the apparatus at least to obtain at a user equipment an allocation of a single physical uplink control channel format 1a/1b resource, where physical uplink control channel resources are reserved with a granularity of one acknowledge/negative acknowledge (ACK/NACK) bundle; to perform ACK/NACK bundling across spatial codewords, where one bundled ACK/NACK bit per received component carrier/subframe is generated); and to select a constellation point for transmission on the uplink based on a value of a bundled ACK/NACK bit and a value of a downlink assignment index of a last received physical downlink control channel within an ACK/NACK bundle.

The exemplary embodiments also encompass apparatus that comprises means for obtaining at a user equipment an allocation of a single physical uplink control channel format 1a/1b resource, where physical uplink control channel resources are reserved with a granularity of one acknowledge/negative acknowledge (ACK/NACK) bundle, means for performing ACK/NACK bundling across spatial codewords, where one bundled ACK/NACK bit per received component carrier/subframe is generated); and means for selecting a constellation point for transmission on the uplink based on a value of a bundled ACK/NACK bit and a value of a downlink assignment index of a last received physical downlink control channel within an ACK/NACK bundle.

The exemplary embodiments also encompass apparatus of a type having at least one processor and memory including computer program code, where the memory and computer program code are configured to, with the processor, cause the apparatus at least to obtain at a user equipment an allocation of a plurality of physical uplink control channel format 1a/1b resources, where physical uplink control channel resources are reserved with a granularity of one acknowledge/negative acknowledge (ACK/NACK) bundle; and select one of the plurality of physical uplink control channel format 1a/1b resources to send a bundled ACK/NACK result based on a value of a downlink assignment index of a last received physical downlink control channel within an ACK/NACK bundle.

The exemplary embodiments also encompass apparatus that comprises means for obtaining at a user equipment an allocation of a plurality of physical uplink control channel format 1a/1b resources, where physical uplink control channel resources are reserved with a granularity of one acknowledge/negative acknowledge (ACK/NACK) bundle; and means for selecting one of the plurality of physical uplink control channel format 1a/1b resources to send a bundled ACK/NACK result based on a value of a downlink assignment index of a last received physical downlink control channel within an ACK/NACK bundle.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the (UTRAN-LTE-A) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters, information elements and other concepts (e.g., ACK/NACK bundling, DAI etc.) are not intended to be limiting in any respect, as these various parameters, information elements and concepts may be identified by any suitable names. Further, the formulas, equations and expressions that are used in a particular application may differ from those expressly disclosed herein. Further, the various names assigned to different channels and channel types (e.g., PDCCH, PUCCH, PUCCH format 1a/1b, etc.) are not intended to be limiting in any respect, as these various channels and channel types may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method, comprising:
when in a time division duplex mode of operation with a user equipment, allocating, by a network access node, physical uplink control channel resources comprising:
reserving physical uplink control channel format 1a/1b resources with at least one acknowledge/negative acknowledge bundle,
where a number of physical uplink control channel format 1a/1b resources are allocated to the user equipment per each of the at least one acknowledge/negative acknowledge bundle,
where the at least one acknowledge/negative acknowledge bundle comprises a set of at least one time division duplex subframe and at least one component carrier that are configured to form a subset of acknowledge/negative feedback to be sent by the user equipment in an uplink as a response to received data in a downlink, and
where a downlink assignment index value is indicated within each of the at least one acknowledge/negative acknowledge bundle; and
sending, by the network access node, an indication of the allocated number of physical uplink control channel format 1a/1b resources reserved with the at least one acknowledge/negative acknowledge bundle to the user equipment,
where one of the physical uplink control channel format 1a/1b resources is selected to send the at least one acknowledge/negative acknowledge bundle based on a value of a downlink assignment index of a last received physical downlink control channel within an acknowledge/negative acknowledge bundle.

2. The method of claim 1, where the physical uplink control channel resources are format 1a/1b resources that are reserved with each of the at least one acknowledge/negative bundle and are at least one of pre-defined and configured.

3. The method as in claim 1, where the subset of acknowledge/negative feedback is to be sent by the user equipment in the uplink as a response to physical downlink shared channel data received in a downlink.

4. The method of claim 3, where constellation point selection is based on a value of a bundled acknowledge/negative acknowledge bit and a value of the downlink assignment index of the last received physical downlink control channel within an acknowledge/negative acknowledge bundle.

5. The method as in claim 1, where the number of physical uplink control channel format 1a/1b resources is predefined based on an amount of different acknowledge/negative acknowledge schemes of the at least one acknowledge/negative acknowledge bundle.

6. The method as in claim 1, where for at least one of acknowledge/negative acknowledge time domain bundling and component carrier domain bundling with channel selection, at least one physical uplink control channel format 1a/1b resource is allocated with the at least one acknowledge/negative acknowledge bundle such that a total number of physical uplink control channel format 1a/1b resources allocated to the user equipment depends on a number of configured acknowledge/negative acknowledge bundles of the user equipment, and where channel selection is performed amongst a plurality of allocated physical uplink control channel resources and is used to convey acknowledge/negative acknowledge bundle results.

7. The method of claim 1, where a position of physical uplink control channel format 1a/1b resources allocated to a given user equipment is determined in accordance with:

$$f(UE_{para}, RA_{index}), \text{ where}$$

$UE_{para}$ is a UE-specific parameter, and
$RA_{index}=1, \ldots, M$, where M is a total number of physical uplink control channel format 1a/1b resources allocated to the given UE 10, and M corresponds to a number of acknowledge/negative acknowledge bundles.

8. A non-transitory computer-readable medium that contains software program instructions, where execution of the software program instructions by at least one data processor resulting in performance of operations that comprise execution of the method of claim 1.

9. An apparatus, comprising:
a processor, and
a memory including computer program code, where the memory and computer program code are configured to, with the processor, cause the apparatus at least to:
when in a time division duplex mode of operation with a user equipment, allocate, by a network access node, physical uplink control channel resources comprising reserving physical uplink control channel format 1a/1b resources with at least one acknowledge/negative acknowledge bundle,
where a number of physical uplink control channel format 1a/1b resources are allocated to the user equipment per each of the at least one acknowledge/negative acknowledge bundle,
where the at least one acknowledge/negative acknowledge bundle comprises a set of at least one time division duplex subframe and at least one component carrier that are configured to form a subset of acknowledge/negative acknowledge feedback to be sent by the user equipment in an uplink as a response to received data in a downlink,
where a downlink assignment index value is indicated within the at least one acknowledge/negative acknowledge bundle; and
send, by the network access node, an indication of the allocated number of physical uplink control channel format 1a/1b resources reserved with the at least one acknowledge/negative acknowledge bundle to the user equipment,
where one of the physical uplink control channel format 1a/1b resources is selected to send the at least one acknowledge/negative acknowledge bundle based on a value of a downlink assignment index of a last received physical downlink control channel within an acknowledge/negative acknowledge bundle.

10. The apparatus of claim 9, where the physical uplink control channel resources are format 1a/1b resources that are reserved with each of the at least one acknowledge/negative bundle and are at least one of pre-defined and configured.

11. The apparatus as in claim 9, where the subset of acknowledge/negative feedback is to be sent by the user equipment in the uplink as a response to physical downlink shared channel data received in a downlink.

12. The apparatus of claim 11, where constellation point selection is based on a value of a bundled acknowledge/negative acknowledge bit of the at least one acknowledge/negative acknowledge bundle and a value of the downlink assignment index of a last received physical downlink control channel within an acknowledge/negative acknowledge bundle.

13. The apparatus as in claim 9, the number of physical uplink control channel format 1a/1b resources is predefined based on an amount of different acknowledge/negative acknowledge schemes of the at least one acknowledge/negative acknowledge bundle.

14. The apparatus as in claim 9, where for at least one of acknowledge/negative acknowledge time domain bundling and component carrier domain bundling with channel selection, one physical uplink control channel format 1a/1b resource is allocated with the at least one acknowledge/negative acknowledge bundle such that a total number of physical uplink control channel format 1a/1b resources allocated to the user equipment depends on a number of configured acknowledge/negative acknowledge bundles of the user equipment, and where channel selection is performed amongst a plurality of allocated physical uplink control channel resources and is used to convey bundled acknowledge/negative acknowledge results.

15. The apparatus of claim 9, where a position of physical uplink control channel format 1a/1b resources allocated to a given user equipment is determined in accordance with:

$f(UE_{para}, RA_{index})$, where $UE_{para}$ is a UE-specific parameter, and
$RA_{index}=1, \ldots, M$, where M is a total number of physical uplink control channel format 1a/1b resources allocated to the given UE, and M corresponds to a number of acknowledge/negative acknowledge bundles.

16. A method comprising:
obtaining at a user equipment at least one acknowledge/negative acknowledge bundle comprising an allocation of a set of at least one time division duplex subframe and at least one component carrier configured to identify a single physical uplink control channel format 1a/1b resource allocated to the user equipment from physical uplink control channel resources reserved with the at least one acknowledge/negative acknowledge bundle,
where a downlink assignment index value is indicated within the acknowledge/negative acknowledge bundle, and
performing acknowledge/negative acknowledge bundling across spatial codewords, where one bundled acknowledge/negative acknowledge bit per received component carrier/subframe is generated; and
selecting a constellation point for transmission on the uplink based on a value of a bundled acknowledge/negative acknowledge bit and a value of a downlink assignment index of a last received physical downlink control channel within an acknowledge/negative acknowledge bundle, where a set of at least one time division duplex subframe and at least one component carrier is configured to form a subset of acknowledge/negative acknowledge feedback to be sent by the user equipment in an uplink as a response to received data in a downlink.

17. A method comprising:
obtaining at a user equipment at least one acknowledge/negative acknowledge bundle comprising an allocation of a set of at least one time division duplex subframe and at least one component carrier configured to identify a single physical uplink control channel format 1a/1b resource allocated to the user equipment from physical uplink control channel resources reserved with the at least one acknowledge/negative acknowledge bundle,
where a downlink assignment index value is indicated within each of the at least one acknowledge/negative acknowledge bundle, and
selecting one of the plurality of physical uplink control channel format 1a/1b resources to send a bundled acknowledge/negative acknowledge result based on a value of a downlink assignment index of a last received physical downlink control channel within an acknowledge/negative acknowledge bundle, where a set of at least one time division duplex subframe and at least one component carrier is configured to form a subset of acknowledge/negative acknowledge feedback to be sent by the user equipment in an uplink.

18. The method of claim 17, where the selecting to send the bundled acknowledge/negative acknowledge result is based on the downlink assignment index value of the last received physical downlink control channel and a total number of the physical uplink control channel format 1a/1b resources allocated to the user equipment.

19. The method of claim 17, where the set of at least one time division duplex subframe and at least one component carrier that is configured to form a subset of acknowledge/negative acknowledge feedback to be sent by the user equipment in an uplink as a response to received data in the downlink.

20. The method as in claim 1, where the downlink assignment index value is a downlink assignment index counter value.

* * * * *